United States Patent
Ho et al.

(10) Patent No.: US 7,602,777 B2
(45) Date of Patent: Oct. 13, 2009

(54) CASCADED CONNECTION MATRICES IN A DISTRIBUTED CROSS-CONNECTION SYSTEM

(76) Inventors: Michael Ho, 4318 Union Street, Burnaby, BC, V5C 2X6 (CA); Miriam Qunell, 1077 Collingwood, Naperville, IL (US) 60540; Jean-Michel Cala, 630 Athens St., San Francisco, CA (US) 94112

( * ) Notice: Subject to any disclaimer, the term of this patent is extended or adjusted under 35 U.S.C. 154(b) by 827 days.

(21) Appl. No.: 11/016,197

(22) Filed: Dec. 17, 2004

(65) Prior Publication Data
US 2006/0133366 A1    Jun. 22, 2006

(51) Int. Cl.
*H04L 12/28* (2006.01)
*H04L 12/56* (2006.01)

(52) U.S. Cl. .................. 370/389; 370/539; 370/541
(58) Field of Classification Search .................. None
See application file for complete search history.

(56) References Cited

U.S. PATENT DOCUMENTS

| | | | |
|---|---|---|---|
| 5,144,620 A * | 9/1992 | Ishizaki et al. .............. 370/535 |
| 6,487,223 B1 | 11/2002 | Tanonaka | |
| 6,560,202 B1 | 5/2003 | Bordogna et al. | |
| 2001/0036187 A1 * | 11/2001 | Lometti et al. .............. 370/395 |
| 2002/0051446 A1 | 5/2002 | Klausmeier et al. | |
| 2004/0037290 A1 * | 2/2004 | Valadarsky et al. ...... 370/395.1 |
| 2004/0066750 A1 * | 4/2004 | Carson et al. .............. 370/250 |
| 2005/0018609 A1 * | 1/2005 | Dally et al. .................. 370/235 |
| 2005/0068991 A1 * | 3/2005 | Jarabek et al. .............. 370/516 |
| 2005/0099941 A1 * | 5/2005 | Sestito et al. ............... 370/228 |
| 2005/0180420 A1 * | 8/2005 | Kurashima et al. .......... 370/389 |
| 2007/0036173 A1 * | 2/2007 | McCrosky et al. .......... 370/463 |

FOREIGN PATENT DOCUMENTS

| | | |
|---|---|---|
| EP | 1463370 A1 | 9/2004 |
| EP | 1599055 A2 | 5/2005 |
| TW | 563028 B | 11/2003 |
| WO | PCT/US2005/046571 | 6/2006 |
| WO | PCT/US2005/046571 | 6/2007 |

OTHER PUBLICATIONS

"Switch and Bait: TranSwitch's VT Crosspoint Devices Let Carriers Deploy "Switchless Switching" & VT Grooming In Metro And Access Networks", Jun. 28, 2004, pp. 1-4, XP-002381457, Network ZONE Product Review.

* cited by examiner

*Primary Examiner*—Ajit Patel
(74) *Attorney, Agent, or Firm*—Blakely, Sokoloff, Taylor & Zafman LLP

(57) ABSTRACT

A method and system for interconnecting multiple distributed components in a communication network is provided. The design includes a multiple order cross connection fabric employed to interconnect multiple orders of data with at least one distributed component in the communication network. The design may further include at least one order of path termination and adaptation connection, where the at least one order of path termination and adaptation connection providing an interface between the multiple order cross connection fabric and a data management system. The design may be implemented in a SONET/SDH environment.

22 Claims, 15 Drawing Sheets

| 810 | 820 | 830 |
|---|---|---|
| Health Condition | Message | Trigger |
| CSI Byte | CSI LUT (converts 8bits to 3 bits) | The CSI byte is filtered by the TFI-5 mapping layer termination. The filtered CSI byte is looked up with an 8bit address, 3 bit content user programmable table producing an output HAPS code. |
| HO Software Fail #1 | Programmable | A read/writable register bit = '1' |
| HO Software Fail #2 | Programmable | A read/writable register bit = '1' |
| AU-AIS | Programmable | TFI-5 mapping layer adaptation (AU pointer interpretation) declares an AU-AIS |
| AU-LOP | Programmable | TFI-5 mapping layer adaptation (AU pointer interpretation) declares an AU-LOP |
| AU-AISC | Programmable | TFI-5 mapping layer adaptation (AU pointer interpretation) declares an AU-AISC for AU-4-Xc payload. |
| AU-LOPC | Programmable | TFI-5 mapping layer adaptation (AU pointer interpretation) declares an AU-LOPC for AU-4-Xc payload. |
| VC-AIS | Programmable | High-Order Tandem Connection Termination declares a VC-AIS |
| HP-DEG | Programmable | High-Order Path Termination/Monitor declares a BIP-8 error rate that is Degraded |
| HP-EXC | Programmable | High-Order Path Termination/Monitor declares a BIP-8 error rate that is Excessive |
| HP-PLM | Programmable | High-Order Path Termination/Monitor declares a payload label mismatch |
| HP-TIM | Programmable | High-Order Path Termination/Monitor declares a J1 Trail Trace Mismatch |
| HP-TIU | Programmable | High-Order Path Termination/Monitor declares a J1 Trail Trace Unstable |

FIG. 8A 810                    820                        880

| Health Condition | Message | Trigger |
| --- | --- | --- |
| HP-UNEQ | Programmable | High-Order Path Termination/Monitor detects an unequipped signal label |
| HP-RDI | Programmable | High-Order Path Termination/Monitor detects an incoming remote defection indication |
| HP-ERDI7 | Programmable | High-Order Path Termination/Monitor detects an incoming enhanced remote defection indication with a value of "111b" |
| HP-ERDI6 | Programmable | High-Order Path Termination/Monitor detects an incoming enhanced remote defection indication with a value of "110b" |
| HP-ERDI5 | Programmable | High-Order Path Termination/Monitor detects an incoming enhanced remote defection indication with a value of "101b" |
| HP-ERDI4 | Programmable | High-Order Path Termination/Monitor detects an incoming enhanced remote defection indication with a value of "100b" |
| HP-ERDI3 | Programmable | High-Order Path Termination/Monitor detects an incoming enhanced remote defection indication with a value of "011b" |
| HP-ERDI2 | Programmable | High-Order Path Termination/Monitor detects an incoming enhanced remote defection indication with a value of "010b" |
| HP-ERDI1 | Programmable | High-Order Path Termination/Monitor detects an incoming enhanced remote defection indication with a value of "001b" |
| PDI-P (1-4) | Programmable | High-Order Path Termination/Monitor detects 1 to 4 payload defect counts |

FIG. 8B

| Health Condition | Message | Trigger |
|---|---|---|
| PDI-P (5-8) | Programmable | High-Order Path Termination/Monitor detects 5 to 8 payload defect counts |
| PDI-P (9-12) | Programmable | High-Order Path Termination/Monitor detects 9 to 12 payload defect counts |
| PDI-P (13-16) | Programmable | High-Order Path Termination/Monitor detects 13 to 16 payload defect counts |
| PDI-P (17-20) | Programmable | High-Order Path Termination/Monitor detects 17 to 20 payload defect counts |
| PDI-P (21-24) | Programmable | High-Order Path Termination/Monitor detects 21 to 24 payload defect counts |
| PDI-P (25-28) | Programmable | High-Order Path Termination/Monitor detects 25 to 28 payload defect counts |

FIG. 8C

| Health Condition | Message | Trigger |
|---|---|---|
| LO Software Fail #1 | Programmable | A read/writable register bit = '1' |
| LO Software Fail #2 | Programmable | A read/writable register bit = '1' |
| TU-AIS | Programmable | High-order adaptation (TU pointer interpretation) declares an TU-AIS |
| TU-LOP | Programmable | High-order adaptation (TU pointer interpretation) declares an TU-LOP |
| LP-DEG | Programmable | Low-Order Path Termination/Monitor declares a BIP-8 error rate that is Degraded |
| LP-EXC | Programmable | Low-Order Path Termination/Monitor declares a BIP-8 error rate that is Excessive |
| LP-PLM | Programmable | Low-Order Path Termination/Monitor declares a payload label mismatch |
| LP-TIM | Programmable | Low-Order Path Termination/Monitor declares a J1 Trail Trace Mismatch |
| LP-TIU | Programmable | Low-Order Path Termination/Monitor declares a J1 Trail Trace Unstable |
| LP-UNEQ | Programmable | Low-Order Path Termination/Monitor detects an unequipped signal label |
| LP-RDI | Programmable | Low-Order Path Termination/Monitor detects an incoming remote defection indication |
| LP-ERDI7 | Programmable | Low-Order Path Termination/Monitor detects an incoming enhanced remote defection indication with a value of "111b" |
| LP-ERDI6 | Programmable | Low-Order Path Termination/Monitor detects an incoming enhanced remote defection indication with a value of "110b" |
| LP-ERDI5 | Programmable | Low-Order Path Termination/Monitor detects an incoming enhanced remote defection indication with a value of "101b" |

FIG. 9A

| Health Condition | Message | Trigger |
|---|---|---|
| LP-ERDI4 | Programmable | Low-Order Path Termination/Monitor detects an incoming enhanced remote defection indication with a value of "100b" |
| LP-ERDI3 | Programmable | Low-Order Path Termination/Monitor detects an incoming enhanced remote defection indication with a value of "011b" |
| LP-ERDI2 | Programmable | Low-Order Path Termination/Monitor detects an incoming enhanced remote defection indication with a value of "010b" |
| LP-ERDI1 | Programmable | Low-Order Path Termination/Monitor detects an incoming enhanced remote defection indication with a value of "001b" |

FIG. 9B

CASCADED CONNECTION MATRICES IN A DISTRIBUTED CROSS-CONNECTION SYSTEM

BACKGROUND OF THE INVENTION

1. Field of the Invention

The present invention relates generally to the field of high-speed data transfer, and more specifically to managing cross connect matrices within a data transfer architecture.

2. Description of the Related Art

Current high-speed high bandwidth data communication systems employ a variety of components to facilitate the receipt and transmission of data packets. Among the components used are network nodes, which may include functional components such as framers and cross-connects between components that allow data transport over at least one channel. A framer is a device that handles the overhead processing and statistics for the SONET/SDH connection and provides a method of distinguishing digital channels multiplexed together. The framer designates or marks channels within a bit stream, providing the basic time slot structure, management, and fault isolation for the network node. The cross connect allows portions of a digital bit stream to be rerouted or connected to different bit streams. Cross connects enable data traffic to be moved from one SONET ring to the next ring in its path to the destination node.

Typically, these high-speed high bandwidth data communication systems are realized by interconnecting a large number of network nodes to receive and transmit ever-increasing amounts of data. When interconnecting such nodes using cross connects, the traffic may be groomed, protection switching applied, and bridging and routing of data employed. Grooming is the ability to break up incoming data frames into lower bandwidth components, followed by switching the lower bandwidth components between incoming frames to form output frames. Protection switching is the ability to switch between components when a failure is encountered, such as a component failure. Bridging differs from routing in that bridging creates a connection between components, while routing directs data from one component to another where a bridge may or may not be present.

Traffic for transport networks can be carried in high-order (HO) or low-order (LO) containers, two standards specified in the SONET/SDH architecture. Network nodes may employ connection matrices to address HO and LO traffic separated by the LO pointer and overhead processors. The connection matrix is a matrix establishing all connections between all points in the relevant portion or entirety of the network.

In a distributed implementation where each connection matrix is implemented using several devices, the large amount of bandwidth at each level of the cascaded matrix mandates the use of multiple interconnects. Use of cascaded matrices in a distributed system requires N sets of interconnects, where N is the number of cascaded connection matrices. Cascaded matrices or cascaded connection matrices are a series of portions of a connection matrix, such as columns, that establish the connections between one component and another component in the network.

The problem encountered using connection matrices is that of distribution. Connection matrices and cascaded connection matrices may be distributed throughout the network, and may be updated in certain components while not updated in others. This wide distribution of connection matrices causes routing congestion on the device, can require increased component size, thus taking up more space or real estate on the board, and can ultimately require more power to support the required functionality of the network.

A design that provides for and uses an efficiently ordered set of connection matrices and/or cascaded connection matrices may provide increased throughput and other advantageous qualities over previously known designs, including designs employing the SONET/SDH architecture.

DESCRIPTION OF THE DRAWINGS

The present invention is illustrated by way of example, and not by way of limitation, in the figures of the accompanying drawings in which:

FIGS. 8A, 8B, and 8C illustrate an example list of possible health codes for high-order conditions;

FIGS. 9A and 9B illustrate an example list of possible health codes for low-order conditions;

DETAILED DESCRIPTION OF THE INVENTION

Reference will now be made in detail to the preferred embodiments of the design, examples of which are illustrated in the accompanying drawings and tables. While the design will be described in conjunction with the preferred embodiments, it will be understood that they are not intended to limit the design to those embodiments. On the contrary, the design is intended to cover alternatives, modifications, and equivalents, which may be included within the spirit and scope of the design as defined by the appended claims.

The present design may provide for a unified HO/LO cross connect fabric and individual HO and LO paths connecting to the unified HO/LO cross connect fabric. The design may establish a single point of interconnection for both low order and high order connections.

Data transmission over fiber optics networks may conform to the SONET and/or SDH standards. SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU). As used herein, the SONET/SDH concepts are more fully detailed in various ANSI and ITU standards, including but not limited to the discussion of "health", Bellcore GR-253, ANSI T1.105, ITU G.707, G.751, G.783, and G.804.

System Design

Figure 1:
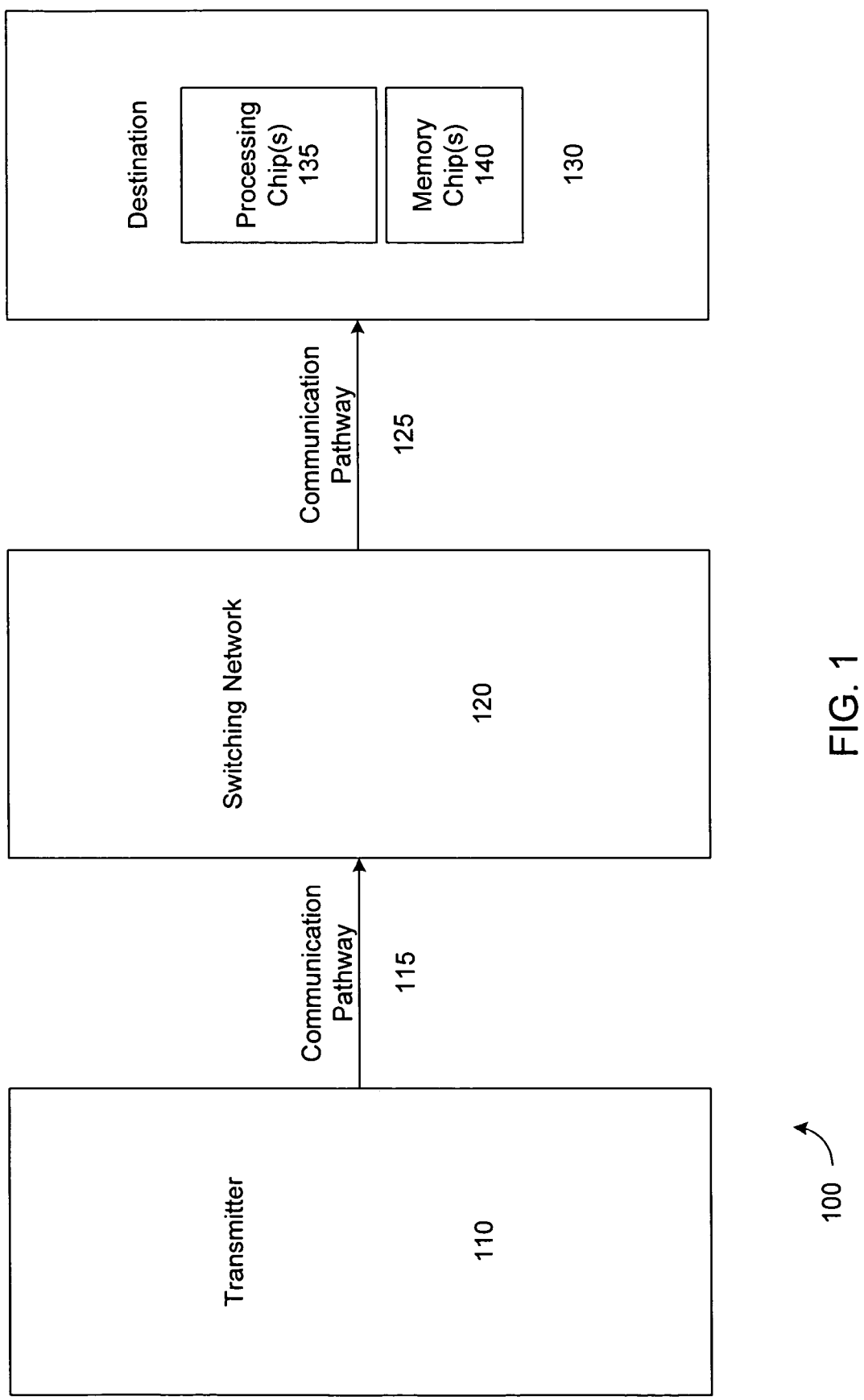
FIG. 1 is a conceptual illustration of a SONET/SDH communications switching system employing the design provided herein.

A typical SONET/SDH switching system 100 is shown in FIG. 1. In the SONET/SDH switching system 100, a transmitter 110 is connected through a communication pathway 115 to a switching network 120. Switching network 120 is connected through a communication pathway 125 to a destination 130. The transmitter 110 sends data as a series of payloads/frames to the destination 130 through the switching network 120. In the switching network 120, packets typically pass through a series of hardware and/or software components, such as servers. As each payload arrives at a hardware and/or software component, the component may store the payload briefly before transmitting the payload to the next component. The payloads proceed individually through the network until they arrive at the destination 130. The destination 130 may contain one or more processing chips 135 and/or one or more memory chips 140.

Figure 2:
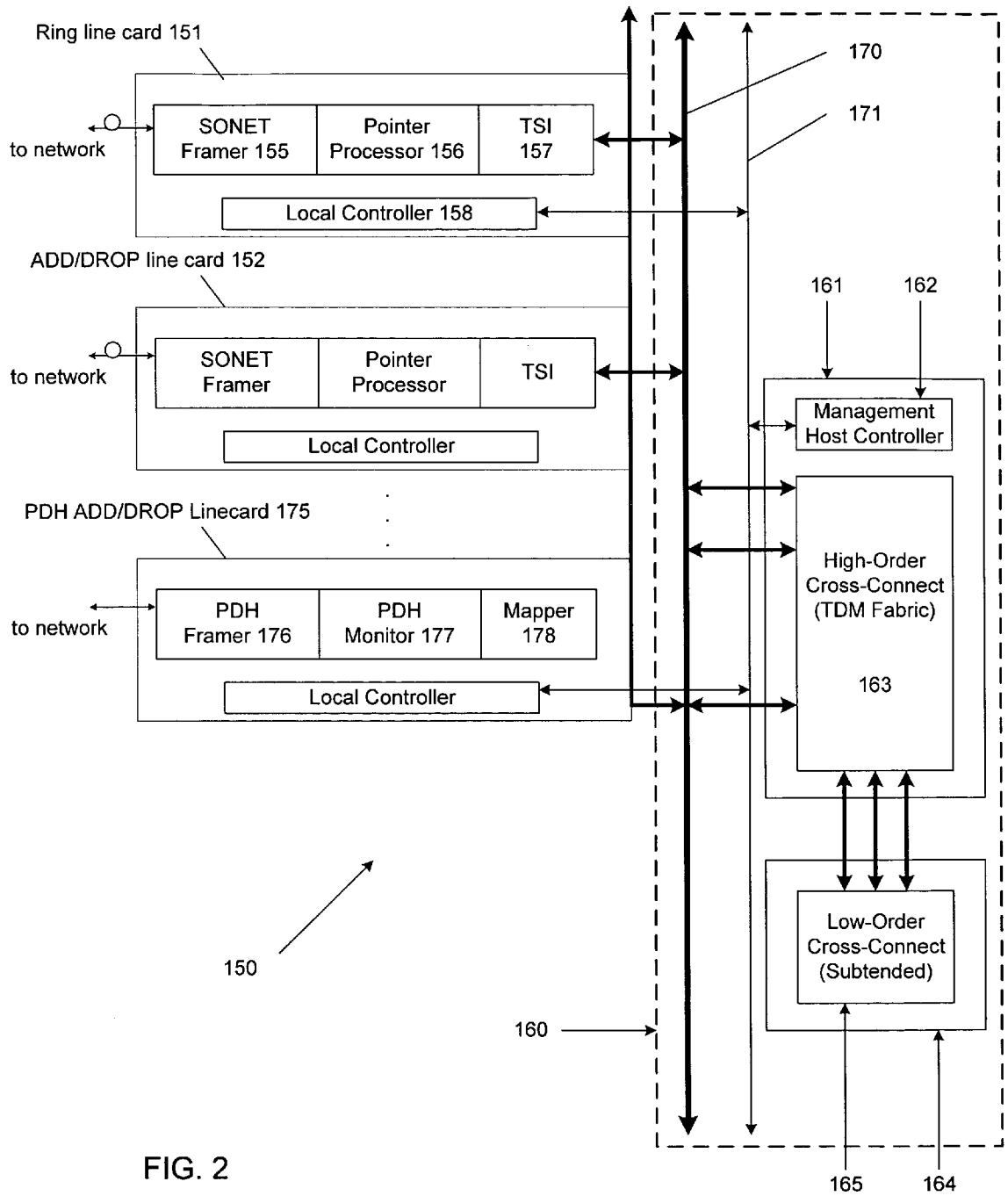
FIG. 2 shows a suitable system embodiment in accordance with an embodiment of the present invention.

FIG. 2 is a drawing of a typical SONET/SDH Add-Drop Multiplex (ADM) 150. The ADM 150 manages SONET/SDH network topologies, the most typical topology being a ring. In a ring topology, the ADM 150 connects to the ring using two linecards: a first (ring) linecard 151 connected to the West Interface and a second (ADD/DROP) linecard 152 connected to the East Interface. Other linecards can be used as traffic sources and sinks (not shown), where a source may be involved in an ADD operation, and a sink may be involved in a DROP operation. An ADD operation inserts traffic from the source onto the ring, and a DROP operation removes traffic off the ring to the sink.

Each ring linecard, such as first linecard 151, may include a framer 155, pointer processor 156, and a timeslot interchange (TSI) 157. The framer 155 can be used to locate the beginning of a SONET/SDH frame. The pointer processor 156 may locate the payload and align the payload for the TSI and fabric 160. The TSI 157 may move or groom timeslots within an SONET/SDH frame to provide orderly traffic to the fabric card 161.

Different types of ADD/DROP linecards exist. Some ADD/DROP linecards may handle Ethernet packets, Plesiosynchronous digital hierarchy (PDH) traffic (T1, T3, E1, E3, etc), and/or transit traffic from other SONET/SDH rings. Other types of ADD/DROP linecards may include transit ADD/DROP linecards, similar to the RING linecards. A PDH linecard may contain a T1/E1 framer that searches for the beginning of T1/E1 frame, a performance monitoring function for tracking the status of the incoming frame, and a mapper to insert the PDH traffic into a SONET/SDH frame, thus making the PDH traffic understandable to the fabric 160. PDH ADD/DROP linecard 175 includes PDH framer 176, PDH Monitor 177, and mapper 178.

Fabric management card 161 contains management host controller 162 and high order cross connect or TDM fabric 163, and may interface with subtended fabric 164 containing low-order cross-connect 165. The subtended fabric 164 may fit in one or more line card slots. Fabric backplane 171 may be TFI-5 or proprietary, for example. Control plane 172 may be PCI compatible or a simple microcontroller interface depending on the application. Other configurations may be employed for the backplane and control plane elements.

The transmission path of the ADM 150 comprises a time division multiplexing (TDM) fabric or cross-connect 160 that moves traffic among all the linecards attached to the fabric 160. A high-order cross-connect or fabric moves high-order SONET/SDH containers between linecards and amongst time-slots within a SONET/SDH framer. A full function ADM 150 can manipulate low-order as well as high-order SONET/SDH containers. The low-order manipulation can be performed in a subtended low-order cross-connect. Use of multiple fabrics may create issues that could be resolved by providing a single, unified fabric as is done in the current design.

Unified Cross Connection Matrix Design

Figure 3:
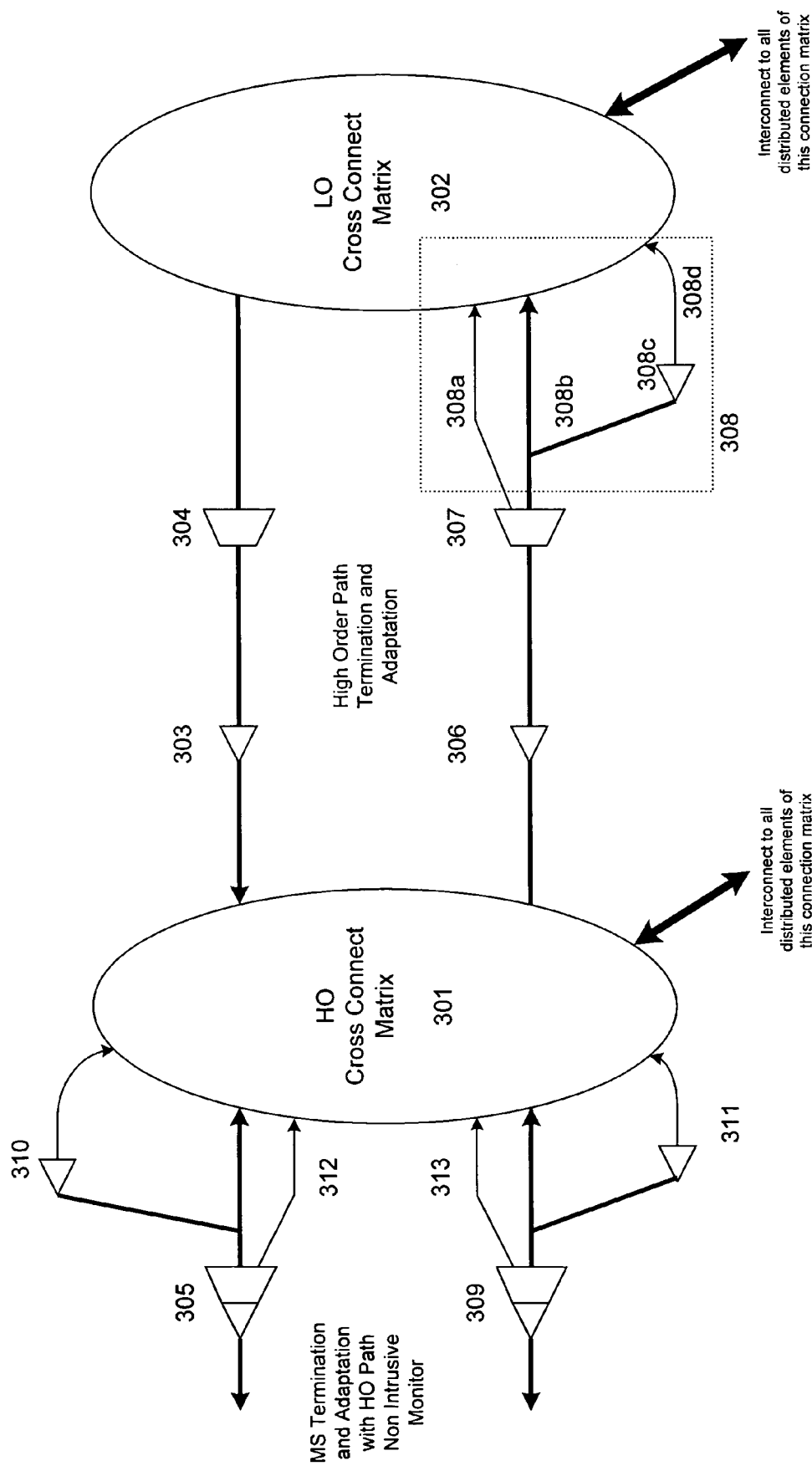
FIG. 3 illustrates cascaded connection matrices.

From FIG. 3, HO cross connect matrix 301 is connected to LO cross connect matrix 302 by a high order path termination and adaptation connections. Triangles such as that shown as element 303 represent termination points, which terminate the overhead and the container transmitted no longer exists. The trapezoidal elements, such as element 304, are adaptation elements that adapt and pass the payload portion of the message. Adaptation comprises pointer determination and/or pointer generation in this context. The combination element, such as element 305, represents both the termination and the adaptation of the message received.

From FIG. 3, data may flow from LO cross connect matrix 302 to HO cross connect matrix 301 through adaptation element 304 and termination element 303. Data may alternately flow from HO cross connect matrix 301 to LO cross connect matrix 302 through termination element 306 and adaptation element 307. Both of these paths represent the high order path termination and adaptation functionality.

As illustrated, the LO cross connect matrix 302 interconnects with all distributed elements of the specific connection matrix interfacing with the LO cross connection matrix 302. As may be appreciated, such a design may be used within a multiple element arrangement, such as where redundant components are available. The interconnection between the LO cross connection matrix 302 and all distributed elements provides the information to all distributed and/or redundant interconnected network elements. Likewise, the HO cross connect matrix 301 provides an interconnection with all distributed elements of the connection matrix, and thus can provide HO data to other connected and/or redundant components.

The LO cross connect matrix interfaces with adaptation element 306 using arrangement 308, which includes path 308a, path 308b, termination element 308c, and path 308d. Path 308b, termination element 308c, and path 308d provide for low order path non-intrusive monitoring, enabling monitoring of the content of the low order path and the data provided from HO cross connect matrix 301 to LO cross connect matrix 302. Such monitoring enables evaluating the data flowing to the LO cross connect matrix 302, and if acceptable, forwarding the data to the LO cross connect matrix 302. If the data is all LO and no monitoring is needed, path 308a passes the data to the LO cross connect matrix 302.

Features 305 and 309 represent combination termination and adaptation elements that interface the Management System (MS) with the HO cross connect matrix 301, and terminate the packets and adapt the packets received into HO components. The two paths represent two different incoming streams from the MS. Element 310 is a termination component in a high order path non-intrusive monitor, while element 311 is an alternate termination component for the high order path. Each of the two paths thus contains a high order path non-intrusive monitor, and each operates to detect a defective or bad message received. If such a defective message is located, operation switches to the other data path from the MS to the HO cross connect matrix 301. Monitoring may be bypassed if undesired or unnecessary, or in the event pointers or the high order payload are unavailable, using paths 312 or 313.

By way of definition, in the scenario presented, a distributed cross connect arrangement indicates multiple components are interconnected to form a relatively large capacity non-blocking cross connect. For a network comprising four devices, where each device has a non-blocking cross connect bidirectional capacity of 20 Gbps, the entire network becomes a single non-blocking cross connect with 80 Gbps bidirectional capacity.

Non-blocking in this context means that any timeslot can be cross connected to any one or other timeslot without being blocked by connections of another timeslot to yet other timeslots. Timeslot A can be cross connected to timeslot B without being blocked by timeslot C being connected to timeslot D. Bidirectional capacity is a term indicating that capacity is summed, such that 10 Gbps counts for both output and input capacity. 80 Gbps means 80 Gbps of input and 80 Gbps of output. Interconnecting elements to form an equivalent but larger capacity element is termed "stacking."

Unifying the cascaded cross connect tends to minimize the number of physical interconnections and bandwidth required to stack cross connection elements. In the case of separate high order and low order cross connections, elements generally may require, in a SONET implementation for example, 80 Gbps of bidirectional bandwidth for each of the low order and high order cross connects for a total of 160 Gbps bidirectional. In the unified case, transmission and reception only requires 80 Gbps bidirectional.

With these definitions in mind, issues with the design of FIG. 3 may include dealing with a significant number of I/O connections, and excessive power consumption.

Figure 4:
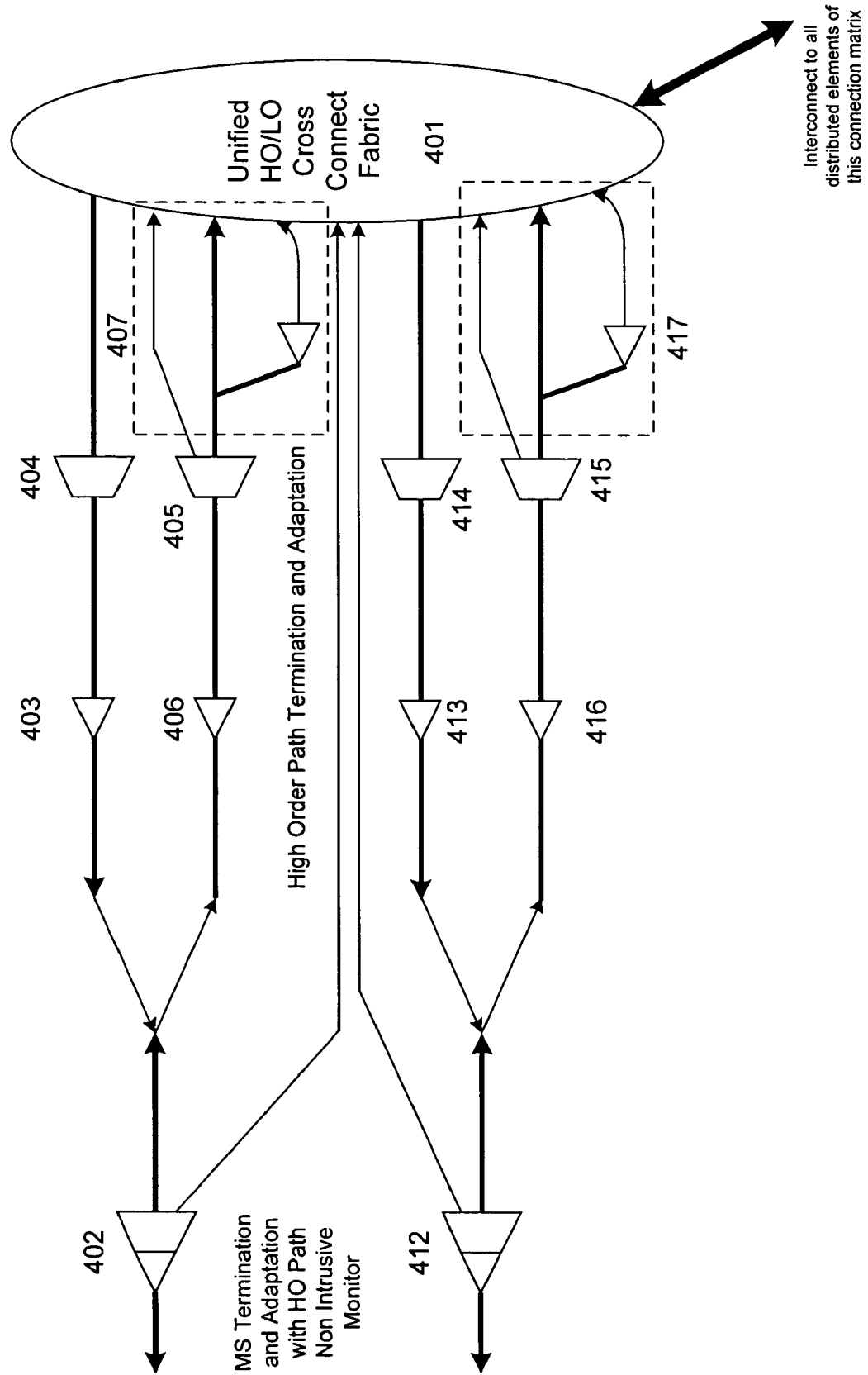
FIG. 4 shows a unified cascaded connection matrix in accordance with the present design.

The present design comprises a unified HO/LO cross connect fabric 401 as shown in FIG. 4, also referred to as a multiple order cross connect fabric. The unified cross connect fabric connects all distributed elements and specifically both the high order and low order aspects of each in a single fabric rather than two separate fabrics. Such a design allows for a single matrix to perform the interconnect functions of the cross connect fabric. Fabrication of a unified cross connect fabric comprises simply combining all performance of the HO and LO cross connect fabrics 301 and 302 from FIG. 3 into a single unified cross connect fabric, addressing both high order and low order functionality.

From FIG. 4, two paths are available to address unified HO/LO cross connect fabric 401, namely an upper path and a lower path. The upper path includes combined element 402, termination element 403, adaptation element 404, as well as adaptation element 405, termination element 406, and low order path non-intrusive monitor 407. As with the previous design of FIG. 3, the low order path non-intrusive monitor monitors the low order path for and may remove unacceptable data. This low order path non-intrusive monitor 407 may be bypassed. The lower path offers similar components, namely combined element 412, termination element 413, adaptation element 414, as well as adaptation element 415, termination element 416, and low order path non-intrusive monitor 417. As contrasted with the design of FIG. 3, a single interconnection is provided with a single fabric to and from external distributed elements, and rather than processing a high order matrix and its functionality in addition to a low order matrix and its associated functionality, a single fabric is operated. The design of FIG. 4 provides for a cascaded connection matrix using interconnected elements and devices using a single point of connection. The single point of connection enables centralized control of all protection schemes at all protection levels. Centralization can be employed using a single controller, where the FIG. 3 design required a plurality of controllers. All statuses from all layers may be available using the design of FIG. 4.

Separate components and schemes may be employed to effectuate the design of FIG. 4. Protection schemes may exist at different levels, and cascaded protection schemes may be accomplished by, for example, using an array of connection maps or a generically reconfigurable restoration connection matrix as described below. Remote status forwarding in the design of FIG. 4 may be realized using the remote status design forwarding described below. Status may be communicated from all cascaded layers to the location of the unified matrix using the channel health encoder described below.

Protection Schemes/Health Assessment and Repair

Cascaded protection schemes may be implemented in different ways. Generally, one design for implementing a cascaded protection scheme uses an array of connection maps where the working channel connection maps and the protection channel connection maps are stored. If each level of the cascaded matrix requires M of these maps, a unified N level cascaded system may employ $M^N$ connection maps. Alternately, the design may employ a micro engine enabled controller to reprogram a single connection map driven by a cascaded system of maps employing M×N maps, generally resulting in the same number as a cascaded arrangement of connection maps.

Network elements in a high speed communication environment, such as SONET/SDH, generate and report a plurality of health codes including but not limited to statuses, alarms, and defects. Each health code may be assigned a severity level by the reporting network element. The repairing element may filter these detected health codes and associated severity assignments to prevent erroneous health codes from causing undesired protection switches. In such a situation, reporting an unfiltered health code may result in the network element considering a network element defective when it is not, and activating a protection switch to address the perceived defect issue.

Health codes enable repairing network elements to identify a healthiest channel by comparing health code values received for all channels within the fabric. The challenge faced occurs when the network element responsible for repairing a failure within a transport channel must rapidly and accurately interpret the transport channel health and initiate appropriate corrective action to restore a failing connection.

The present system may employ a technique whereby the health of a connection channel generated and reported by a network element is detected and optionally filtered, communicated to the repairing element, a restoration determined based on the connection channel health values, and repair is realized by re-provisioning the cross connect. This design may provide for detecting transport channel health codes (e.g. statuses, alarms and defects) and filtering these codes to extract one or more of the highest severity health status originating from detecting network elements representing a connection fault, communicating the detected status to a network element responsible for repairing the connection, applying a filter, such as a persistent filter, at the repairing network element to prevent erroneous health codes from causing undesired protection switches to occur, employing a processing device such as a micro engine inside a repairing element, to determine how best to repair the failed connection within the available network fabric, and re-provisioning the cross connect to affect a relatively rapid repair for the failed connection.

The present design will be illustrated below in an exemplary SONET/SDH transport data flow system utilizing separate elements for detection functions and restore functions. The present design is applicable to any network architecture where the detecting functions are located in a separate device from the function employed to restore connections.

Figure 5:
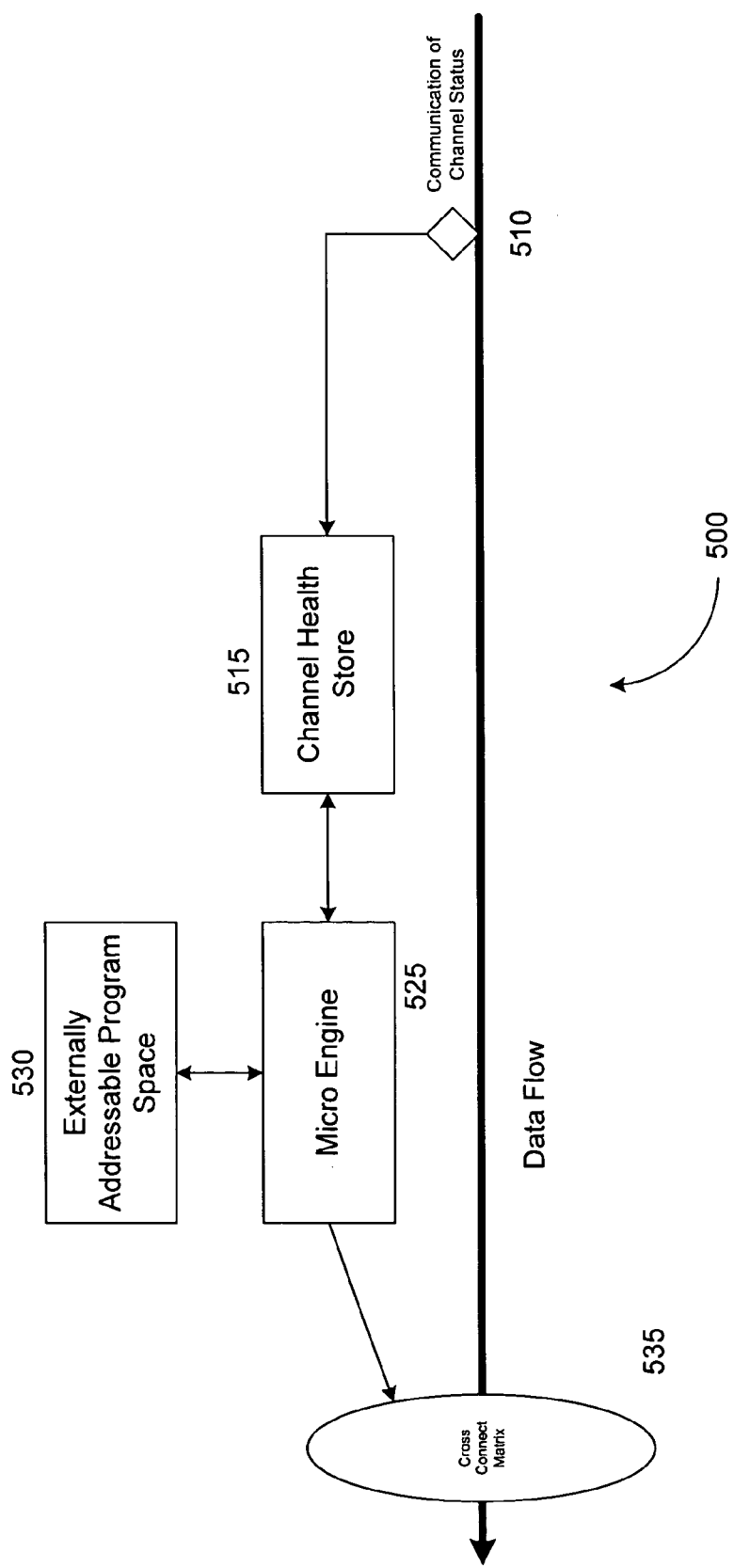
FIG. 5 is a generically re-configurable restoration connection matrix for a transport system.

A generically re-configurable restoration connection matrix for a transport system 500 is shown in FIG. 5. The transport system 500 may conform to SONET/SDH standards. FIG. 5 illustrates an example of SONET/SDH implementation where health codes originating from detecting network elements (not shown) and other system statuses, including but not limited to pointer and overhead processors, are communicated in-band using available transport overhead bytes to convey network health to a down stream repairing element. Pointer processing accommodates possible movement of the non-synchronous payloads within SONET/SDH containers. Path overhead processing entails processing all defined transport overhead and path overhead bytes, including framing, scrambling and de-scrambling, alarm signal insertion and detection, and remote failure insertion and detection. In-band signaling entails making three bytes available in the section layer to form a 192 kbs message channel, providing a message-based channel for transmission of alarms, maintenance, control, and administration between section-terminating network equipment.

The repairing element receives the health codes and processes the health codes using a user programmable processor or micro engine. The processing determines the healthiest channel from among the available transport channels by directly comparing the health code values received for multiple transport channels. The repairing element then determines how to repair the failed connection depending on the failure encountered and may re-provision the connection using a separate network element within the system.

Repair may require, among other options, removing a transport channel from consideration in a worst case, or possibly alerting a physical repair person or entity, or requesting application of power to a powered down component. Repair options depend on circumstance and available repair means, and are broadly known within the art. For example, if a component is not transmitting data and it is simply turned off, repair may comprise either sending an alert to an appropriate entity requesting powering up the component, or providing a signal to a control component to provide power to the component, or simply bypassing the component or channel altogether. In the present discussion, repair will be generally referenced, but such repair is to be understood to be circumstance, available repair means, and architect dependent as known to those skilled in the art.

In the generically reconfigurable restoration connection matrix for a transport system 500, one or more detecting network elements, one or more high order data path processors, and one or more low order data path processors may generate and send encodings of detected statuses, alarms, and defects. These encodings represent the quality of each observed transport channel and communicate the quality via interoperable health codes, in one embodiment using in-band signaling techniques, at 510. The present design is not limited to using an in-band signaling communication technique for conveying network health, but instead may encompass any type of signaling.

Health codes are received and stored by a channel health storage unit 515, located adjacent to the cross connect in FIG. 5, and made available to the network element for analysis. Each health code may be received at point 510 as a formatted three bit priority code, wherein the highest encoded priority may represent the worst defects or alarms, and the lowest priority may be for no defects or alarms. In this arrangement, the lowest priority health code represents the healthiest transport channel.

The processor or micro engine 525 may analyze the health of each incoming channel. The micro engine 525 may control mapping of the fabric, detect defects at the pointer processors, and switch at the cross connects. Switching entails applying a switch and changing a state for purposes of repair. Micro engine 525 may analyze a protocol carried in any of the transport overhead bytes, and such functionality may in one embodiment be provided by an operator or user. The micro engine restoration decision-making process may be provided via externally addressable program space 530 to implement any standard or proprietary transport restoration scheme. In other words, the design is fashioned to receive a health code in a prearranged format and assess health based on the data received in the prearranged format.

The micro engine 525 may extract the encoded control messages from the channel health store 515 at the cross connect matrix. The micro engine 525 may further extract resident state memory and timer information. The micro engine 525 may apply a persistent filtering scheme to prevent erroneous health codes from causing undesired protection switches to occur. One such filter may count the number of consecutive frames having the same health code. This count of the number of consecutive frames can vary depending on desired performance. Once this count of consecutive frames having the same health code is reached, the micro engine 525 may accept the health code for processing. At this point, the micro engine 525 may forward the filtered health code to a lookup table. Health codes are stored and may subsequently be accessed by the micro engine 525.

The micro engine 525 may compare extracted health codes, make protection switch decisions, and provide relatively fast matrix reconfiguration capabilities. The micro engine 525 can then select appropriate protection maps at the cross connect. The micro engine 525 may employ two types of connection maps, namely a working map and a protection map. An output connection map can be a table of coordinates used to identify those inputs connected to specific available outputs. A working map typically contains connection coordinates for the working connections for each connectable container, such as a SONET/SDH container. Protection maps are typically employed in the presence of protection switching, where protection switching allows data on a failed component to be moved to an alternate component. Several protection maps may be used to derive connection coordinates for the protection connections. These coordinates uniquely identify each Tributary Unit (TU) or Administrative Unit (AU) within a protection switching scheme. Coordinates can be high order or low order, where high order coordinates identify to the AU level and low order to the TU level. Maps may be provisioned via the micro engine interface (not shown).

A working map is employed whether or not protection switching is configured. When the network device is configured for protection switching, the network device may store the working connection coordinates. When protection switching is not configured, the network device may store the Time-Slot Interchange (TSI) connection coordinates. A single working map may apply to both the high-order and low-order cross-connection matrices.

High order protection maps and low order protection maps are available. High-order protection maps provide for protection switching of the high-order coordinates, while low-order protection maps are used to switch low-order coordinates. Protection maps provide coordinates for inputs containing protection traffic. The present system may derive the source coordinate for protection based on a combination of high order and low order protection maps. Combining the upper portion of the coordinate from one high-order protection map and the lower portion of the coordinate from one low-order protection map provides a final source coordinate. For any given destination coordinate, any of the high-order maps and any of the low-order maps can be used to derive final source coordinates for that destination. The micro engine 525 may determine the combination of maps used to determine the final source coordinate by selecting a coordinate within the working map or a coordinate derived from the high-order and low-order protection maps. In other words, the micro engine 525 may have protection maps and working maps at its disposal, and may use these maps to determine a way to reach a desired source coordinate or set of coordinates.

Micro engine 525 may select one of several protection connection maps to use for a given destination connection. This selection criteria may be dictated by incoming health codes. For a given configuration, the micro engine 225 may compare health codes associated with input connections destined for a given output connection. Of these inputs, the micro engine 525 may select the input connection having the best quality or lowest health code.

Before application of the protection switch, the input connection in the foregoing example may be qualified or verified using a variety of post processing filters. Post processing filters are specified in SONET/SDH standards. The following post filters may be implemented using the micro engine 525 via the microcontroller interface (not shown):

1. 1+1 Revertive or Non-Revertive Modes.
2. A Hysteresis Switching Filter. Such a filter may be applied when the priority difference between the health codes of the protection and working traffic exceeds a predetermined amount.
3. Comparison of health codes from multiple protection traffic sources, including comparison of multiple protection switching layers.
4. Post-Hold Timers. Post-hold timers may reduce switching frequency, especially during transient conditions. Such timers can disable switching for a certain amount of time after the last protection switch.
5. Manual User Command via software.

The micro engine 525 may communicate the re-provisioning of the connection maps to the cross connect matrix 535 responsible for restoring the failed connection.

Although the channel health store 515, micro engine 525, and externally addressable program space 530 are shown as three separate elements, these components may be parts of the same application or piece of software, or may be embedded firmware or specialized hardware such as an application specific integrated circuit (ASIC).

Figure 6:
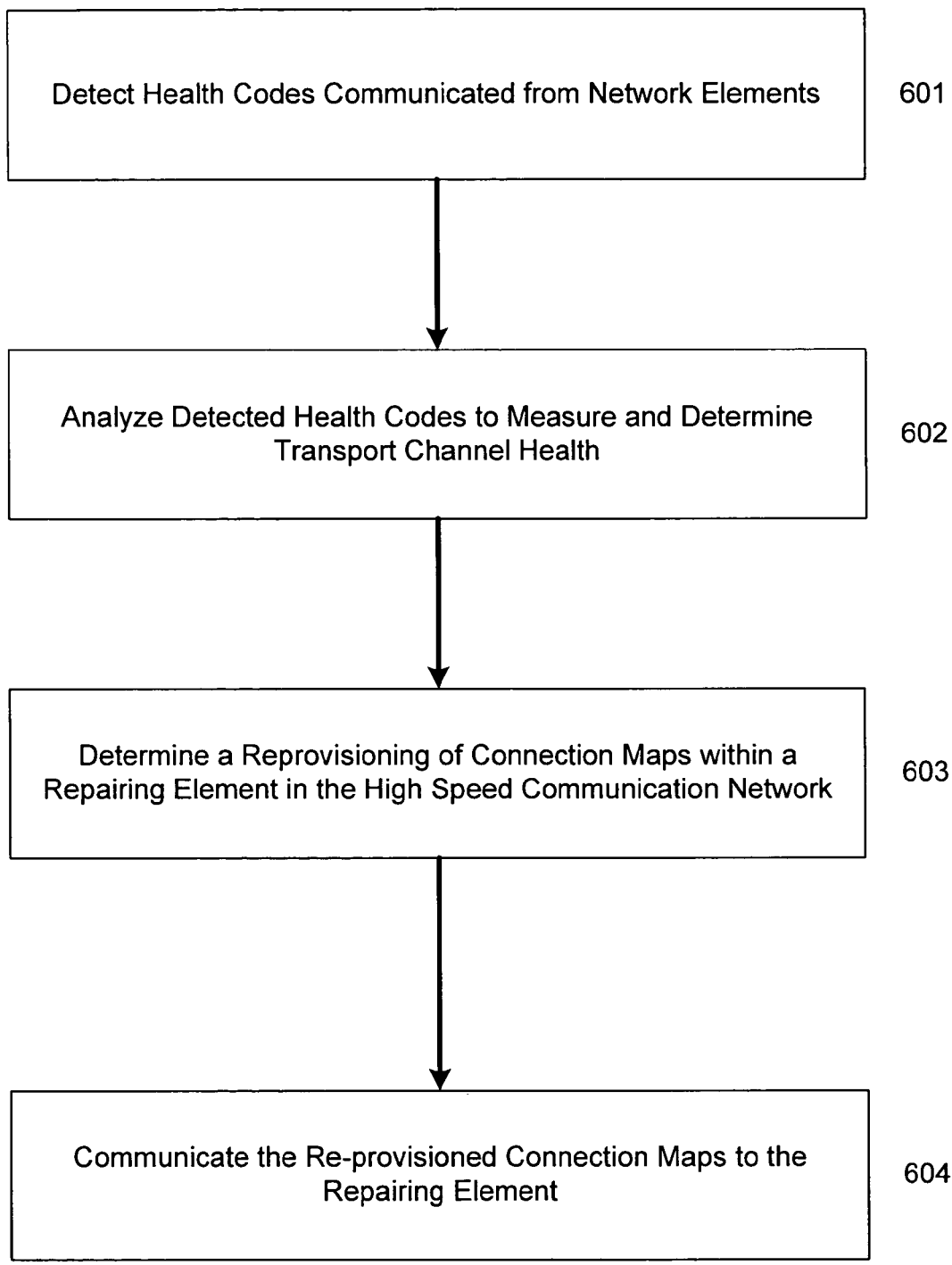
FIG. 6 illustrates a general flowchart of health code assessment and responsive operation.

FIG. 6 illustrates a general flowchart of health code assessment and responsive operation. From FIG. 6, the design detects health codes communicated from network elements at point 601, analyzes detected health codes to measure and determine transport channel health at point 602, determines a reprovisioning of connection maps within a repairing element in the high speed communication network at point 603, and communicates re-provisioned connection maps to the repairing element at point 604.

The communication network architecture may restore a network node connection fault, such as loss of signal, by switching to a redundant connection, called "protection switching." A detecting function or detecting hardware, such as a framer, may generate observed transport channel health information and communicate this information to a connection restoring function, such as a cross-connect, wherein the health detection function and the function of restoring the connection reside in separate network elements.

External SONET/SDH network elements, representing a combination of proprietary and standards-based manufacturer's equipment, may generate and report multiple health signals including but not limited to status, alarms, and defects of individual elements in the network. Each health signal may be assigned a severity level by the reporting external network element. However, these reported health signals and their associated severity assignment may not be uniform or consistent across all network elements. The present design addresses network elements that employ proprietary or other standards to communicate the health of a transport channel in a manner or format that does not comply with other elements in the system. Non-compliant communication results in detected health information that cannot be used by other elements in determining the quality of a transport channel. Furthermore, elements identifying the healthiest channel among a plurality of available transport channels may be unable to consider this detected health information in the comparison process. Thus, in previous systems, performance or service affecting failures, although reported, may not be restored by the repairing element without either manual intervention or automation by use of an external operational support system, such as Network Management System/Element Management System. Both of these methods tend to be relatively slow to respond, and may be inadequate for managing transport channel restoration functions. Additionally, the time required to process a large variety and volume of generated health signals, including those reporting the same problem can impede the fast switching times objectives (e.g. less-than 50-millisecond protection switching) defined in SONET/SDH standards relating to various automated protection schemes, such as the SONET/SDH 1+1 and 1:N line protection.

The present design collects the health of a connection channel, encodes the health, and communicates the health to points in the network for subsequent processing. As used herein, the term "health signal" generally represents a general health of a device in a device specific measurement format. For example, if a data channel is broken and the range of health for the data channel is 1 (healthy) to 5 (broken), the value of 5 is the health metric. The term "health metric" generally represents a converted and possibly standardized health signal, where the health metric may be converted to a standard value usable by downstream components. In the previous example, health signal values may be standardized to a 0 (healthy) to 4 (complete failure) scale and transmitted in a two bit value. In this arrangement, the previous example may require converting the health signal from the 0 to 5 scale into the health metric 0 to 4 scale, and may convert the 5 to a 4, and transmit a "11" binary value as a health metric. The term "health code" represents the code chosen from the health signals available representing at least one and possibly multiple transport channels. Continuing the previous example, a health metric of 0 for a piece of software in transport channel X and a health metric of 0 for a connection hardware element in transport channel X used together in transport channel X with a hardware device having a health metric of 1 may result in a health code of 1 or possibly 0 depending on design choice. As noted below, the health code may represent the worst of all available health metrics or a weighted average or other combination of all health metrics for the transport channel.

The design presented may extract transport channel health signals originating and communicated from external network elements, possibly using proprietary or encodings defined by other standards. The design may convert these external health signals into internal representations, or at least one health metric. The present design may also monitor data path processors, such as SONET/SDH high-order and low-order data path processors, to collect status, alarms, and defects sufficient to derive additional statuses for measuring the transport channels health and for use in computing a health metric for usable transport channels. The design can further translate the collected health metrics into a common set of health codes that may be encoded such that the health codes generated by external network elements can be compared to determine a health code reporting a relative healthier channel than other available channels. The design may additionally communicate to other downstream elements within the system using the healthier channel and/or communicating the healthier channel to the downstream elements.

The present design is illustrated in an exemplary SONET/SDH transport data flow system utilizing separate elements for detection functions and restore functions. However, the present design may apply to any network architecture where the detecting functions are located in a device separate from the function used to restore connections.

Figure 7:
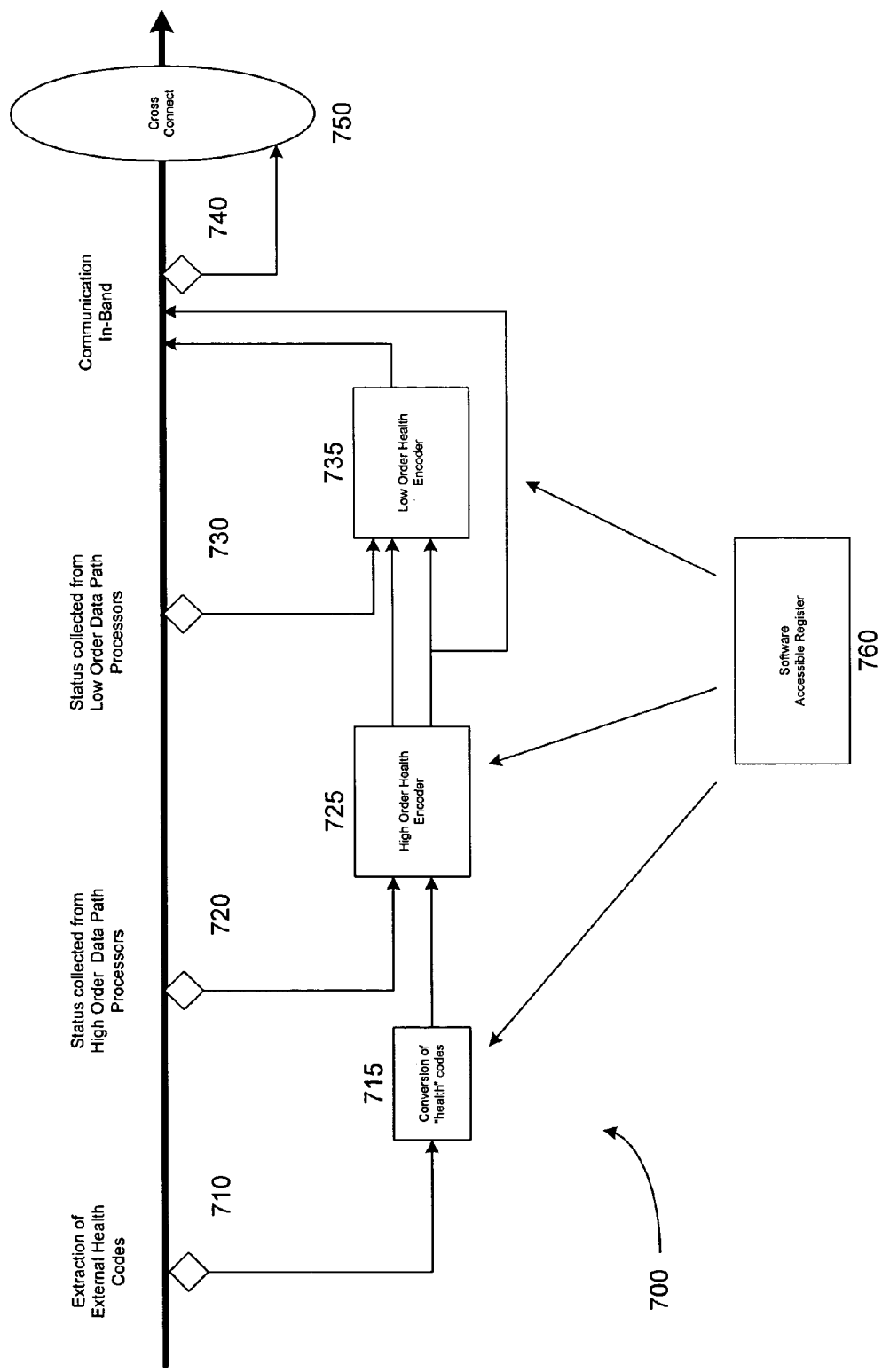
FIG. 7 shows a generic reconfigurable health encoder for high-order and low-order SONET/SDH type cross-connect system.

A generic reconfigurable health encoder for high-order and low-order SONET/SDH cross-connect system 700 is shown in FIG. 7. FIG. 7 illustrates a two layer cascaded implementation communicating health codes to a downstream cross-connect. The health code is located in a separate functional element or another device within the system. A two layer cascaded system is illustrated for simplicity, but not intended to limit the present design in terms of the number of layers that may be protection cascaded. Alternate implementations may include, for example, Bidirectional Line Switched Ring, High order-Unidirectional Path Switched Ring, Low order-Unidirectional Path Switched Ring, Virtual Tributary grooming, and so forth.

In the generic reconfigurable health encoder 700, multiple external network elements 710 represent a mix of proprietary and standards based equipment. As used herein, the term "mix" describes a combination of standard and proprietary health signals generated by detecting elements and communicated to repairing elements, where such standard and proprietary health signals generally are inoperable at receiving elements or nodes, or cannot be understood. One embodiment of the health encoder 700 may be used in a high-order and low-order SONET/SDH cross-connect system. External network elements 710 generate and send encoded detected status, alarm, and defect information represented by one or more external health signals to health code converter 715, called an interpreter. These externally generated health signals may include proprietary encodings and/or encodings defined by one or more standards.

The health code converter 715 may reside in a programmable microprocessor programmed within software accessible internal registers 760 via a microcontroller interface (not shown) of the programmable microprocessor. A conversion process, converting the health code received to a standardized health code, may be realized within the health code converter 715. The conversion process may be user-programmable, enabling external network element health signals to be translated to an internal representation of a health metric. The health code converter 715 may send the resultant converted health metrics to the high-order health encoder 725. In this manner of converting received health codes into converted health metrics, the present design can support and/or operate with equipment conforming to standards or manufactured by different vendors and exhibiting differing health signals.

The high-order health encoder 725 may monitor the high-order fabric transport channels to derive additional statuses for use in assessing each channel's health. The high-order health encoder 725 may use the collected and monitored statuses communicated from high-order data path processors at 720 to compute a health metric for each transport channel. The health metric may indicate a most severe defect indicated by the statuses based on prioritization of the statuses, and may further indicate other defects. Alternately, the health metric may indicate an average or weighted average or other mathematical representation of the health signals received. The high-order health encoder 725 may exclude certain statuses from use during the computation of a health metric. Status information collected from high-order data path processors at 720 may be translated to an internal representation of a health metric and may be prioritized and classified according to selected or user programmable configurations. A user programmable code may be associated with each class. As used herein, the term "class" represents a group of metrics or codes having similar characteristics. For example, a failure status, failure conditions or categories, and failure duration may all be part of a failure class. The quantity of health conditions could exceed that of available codes, so conditions need to be classified and mapped to the corresponding codes. Classes are generally flexible, as they may be programmed by the user.

FIGS. 8A, 8B, and 8C show an example list 800, however not limited to or exhaustive, of possible health conditions 810 for high-order fabric that may be prioritized and classified to generate a user-programmable code 820 and associated triggers 830 for those conditions. Health conditions represent various detected external status, alarm, or defect health signals. The user programmable code reflects the translation of these status, defects and alarms into a three bit message. A trigger 830 represents the actual problem encounter and detected by the reporting element. The first condition shown in FIG. 8A is a CSI byte, which is an external health signal. The code may be compacted, such as from eight bits to three bits using binary conversion, thereby using fewer bits than the collected information per channel. Compacted codes reduce the amount of data required to communicate and store the health status across all functional elements.

At this stage, the high-order health encoder 725 can convert the received health metrics, potentially in three bit compacted form, from one or more health code converters 715 and the computed health metrics from one or more high-order data path processors at 720 into a common set of health codes. The high-order health encoder 725 encodes health metrics such that the resultant health codes generated by external network elements may be compared to each other, and compared to the status, alarms, and defects monitored and collected from the transport channel itself, thus enabling a determination of which code reports a healthier channel.

The computation of health codes may involve a reduction in which multiple statuses of similar severity can be represented by one code value. The resulting code values require fewer bits to encode and transmit. For example, for statuses relating to transmission channels, one set of codes may be "0" for failed and "1" for operational. Alternately, 0 may represent operational, 1 may represent partly damaged, 2 may represent severely damaged, and 3 represents non-operational. Another set of codes may provide for 0 to be fully operational, 1 being 10 percent degraded, 2 being 20 percent degraded, up to 10 being 100 percent degraded. The system can collect these health signals and may equate them in an acceptable manner, such as on a three point scale, where values received are normalized to the three point scale and reported. Weighting may be employed or scaling and rounding or other reasonable numeric techniques. In this manner, each health signal may be efficiently translated into a uniform format health code, where the format may be a single three bit priority code, wherein the highest encoded priority represents the worst defects/alarms, and the lowest priority is for no defects or alarms.

The high-order health encoder 725 may determine the healthiest of multiple transport channels by directly comparing the health code values computed and processed for each transport channel.

The resultant channel health may be communicated to other elements using in-band signaling as shown in FIG. 7 at 740, but not limited to this one communication technique. In-band communication of the channel health may be realized using the Data Communications Channel in the case of the SONET architecture. The system makes three bytes available in the section layer to form a 192 kbs message channel, providing a message based channel for transmission of alarms, maintenance, control, and administration between section terminating network equipment. The high-order health encoder 725 only communicates the highest priority codes downstream to one or more functional elements or cross-connect at 740. At point 740, the health code may be inserted into any unused overhead bytes of the transport overhead frame.

In the SONET/SDH environment, for example, transport overhead may be composed of section overhead and line overhead. Line overhead is accessed, generated and processed by line-terminating equipment and used to support the following functions including multiplexing or concatenating signals, performance monitoring, automatic protection switching, and line maintenance. Section overhead may be used for communication between adjacent network elements. Section overhead may be accessed, generated, and processed by section-terminating equipment and used for performance monitoring, framing, automatic protection switching, line maintenance, and maintenance and provisioning. Additionally, the resultant channel health status may also be communicated to the low-order health encoder 735.

Use of a common health code results in a magnitude indicator, where the magnitude indicator allows each network element to identify a healthiest channel by comparing health code values received when more than one channel is available within the fabric. In other words, a network element having at its disposal three transport channels may determine a first health code for channel X, a second health code for channel Y, and a third health code for channel Z. The result may be a magnitude indicator indicating the best health from among X, Y, and Z.

The low-order health encoder 735 may monitor the low-order fabric transport channels to derive additional statuses for use in measuring the channels health. The low-order health encoder 735 may use the collected and monitored statuses, communicated from a variety of low-order data path processors at 730, to compute a health metric for each transport channel. The health metric indicates the most severe defect indicated by the collected statuses based on a programmable prioritization of the statuses and defects indicated. Additionally, the low-order health encoder 735 may exclude certain statuses from use during computation of a health metric. All status information collected from low-order data path processors at 730 may be translated into an internal representation of the health metric and may be prioritized and classified according to different configurations. A user programmable code may be associated with each class.

FIGS. 9A and 9B include possible health conditions 910 for the low-order fabric that may be prioritized and classified to generate a user-programmable code 920 (i.e. message) and associated trigger 930 for those conditions. The health conditions again represent various detected external status, alarm, or defect health signals. The user programmable code reflects the translation of these status, defects and alarms into a three bit message. The trigger represents the problem encountered and detected by the reporting element. The first condition in FIG. 9A is a LO (low order) Software Fail #1, which is an external health signal representing a failure of a low order software function. This external health signal may be translated into a programmable three bit message, similar to the method used for the high-order encoder. These codes may be compacted into fewer bits than the collected information per channel, reducing the amount of data required and enabling simpler implementation of downstream processing.

The low-order health encoder 735 may convert the received health metrics from one or more high-order health encoders 725 and the computed health metrics from one or more low-order data path processors at 730 into a common set of health codes. The low-order health encoder 735 may encode these health metrics such that the resultant health codes generated by external network elements may be compared to each other and compared to the status, alarms, and defects monitored and collected from the transport channel. The health metric conversion process for the low-order aspect again computes health codes where multiple statuses of similar severity may be represented by one code value. Each health metric may be translated into a health code, formatted as a three bit priority code, wherein the highest encoded priority represents the worst defects/alarms, and the lowest priority is for no defects or alarms. The low-order health encoder 735 may determine the healthiest of multiple transport channels by directly comparing the health code values received for each transport channel.

The resultant channel health may be communicated to other elements using in-band signaling as shown in FIG. 7 at 740 and may employ other communication techniques. Typically the highest priority of these codes are communicated downstream by the low-order health encoder 735 to one or more functional elements, such as a cross-connect at 740 where the resultant health code may be inserted into any unused overhead bytes of the transport overhead frame.

The resultant health codes generated by the high-order and low-order encoders, 725 and 735 respectively, may be communicated to other network elements within the system. Health codes may be compared directly by any network element to determine the healthiest of multiple transport channels. In this aspect, a network element receiving health codes does not require knowledge of the individual statuses or prioritizations used to compute health code values.

In a further aspect of the present design, high-order and low-order encoders may be cascaded to handle multiple network layers, such as three layers, employing multiple health codes.

Although the health code converter 715, high-order health encoder 725, and low-order health encoder 735 are shown in the Figures as three separate elements, these components may be parts of a single application or piece of software, or may be embedded firmware or specialized hardware such as an application specific integrated circuit (ASIC).

Remote Status Indicators

The present design may further broadcast remote status indicators to enable remote status forwarding within cascaded protection systems. The remote status indicators may be broadcast to all remote or distributed sources from which data is redundancy transmitted.

A transport network node has multiple receive and transmit ports by which the transport network and access networks are connected. These nodes typically have large aggregate bandwidths, receiving and transmitting significant quantities of data per unit of time, and use multiple ports to transmit and receive this data. Nodes may be implemented using multiple framer processors, and such a system is considered "distributed" from the node's point of view. The connection between the receive and transmit ports and the remote system or device may require more than a single framer device. Use of such a multiple framer device to connect to a remote system is called an asymmetric connection. The need for asymmetric connections may arise from the desired implementation of the nodes and/or the type of protection switching employed, where protection switching may provide for switching to an alternate component or resource in the event of a failure.

Figure 10:
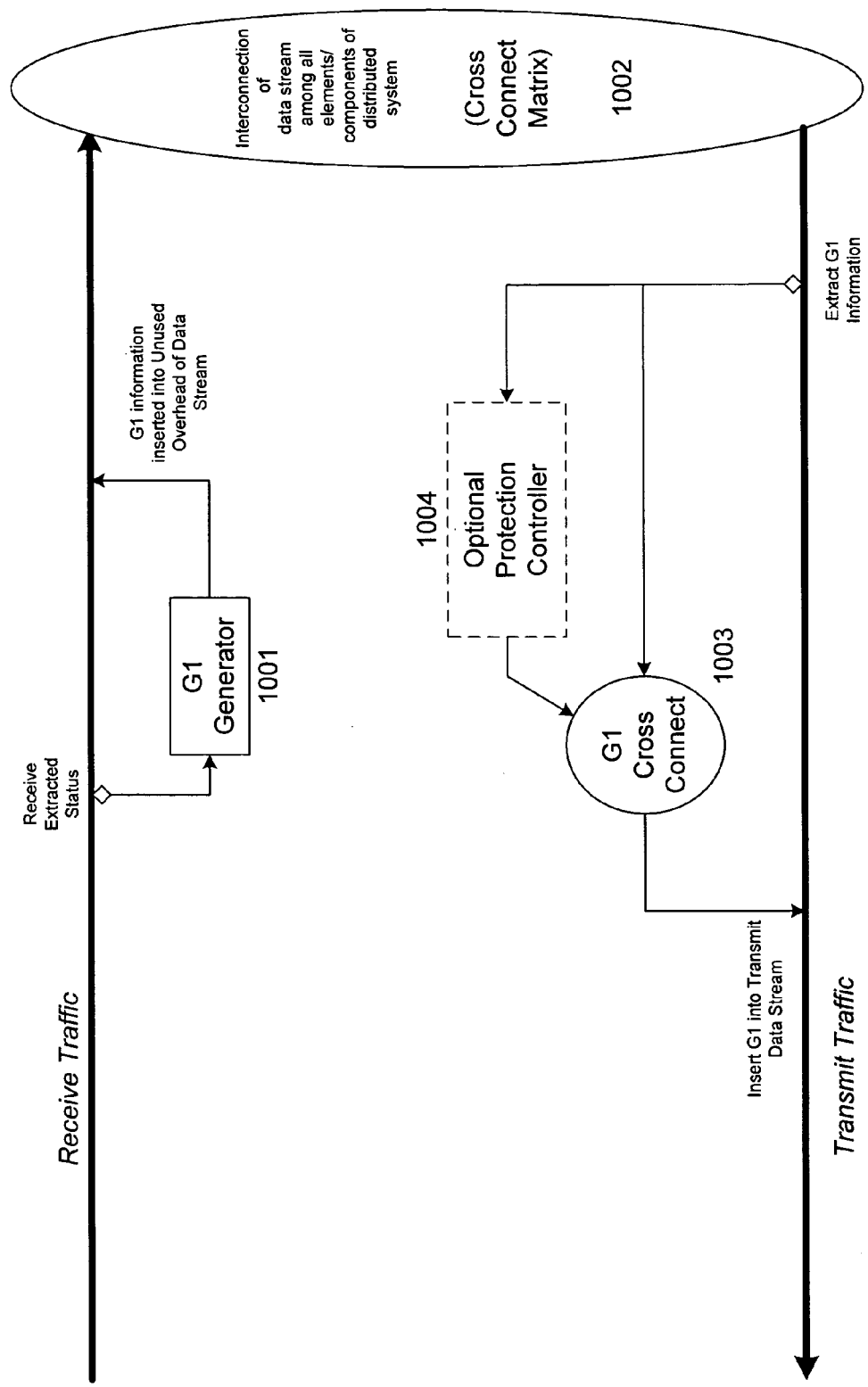
FIG. 10 illustrates the general traffic flow and forwarding mechanism configuration within a single device.
Figure 11:
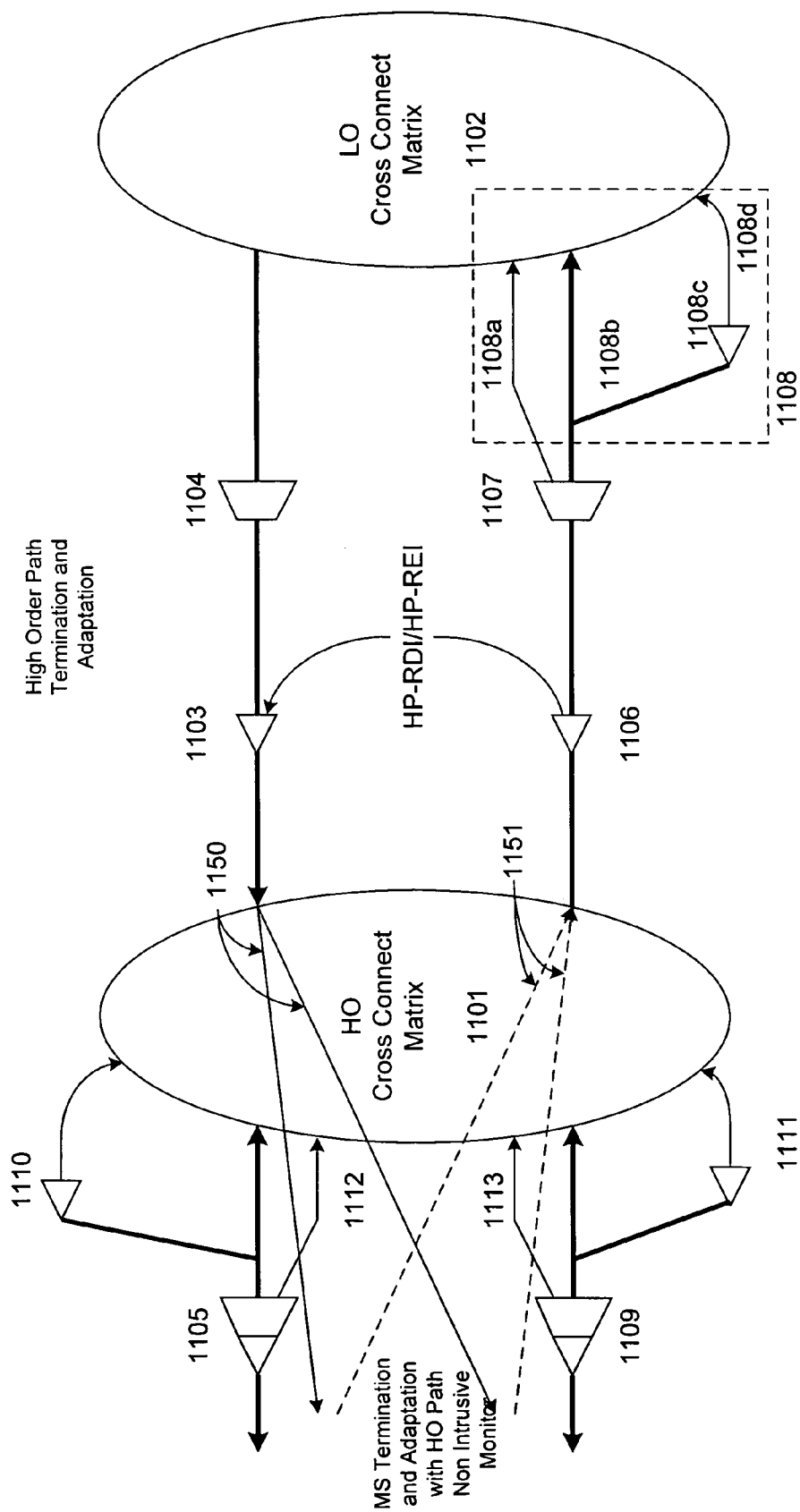
FIG. 11 shows G1 remote status forwarding in cascaded connection matrices.
Figure 12:
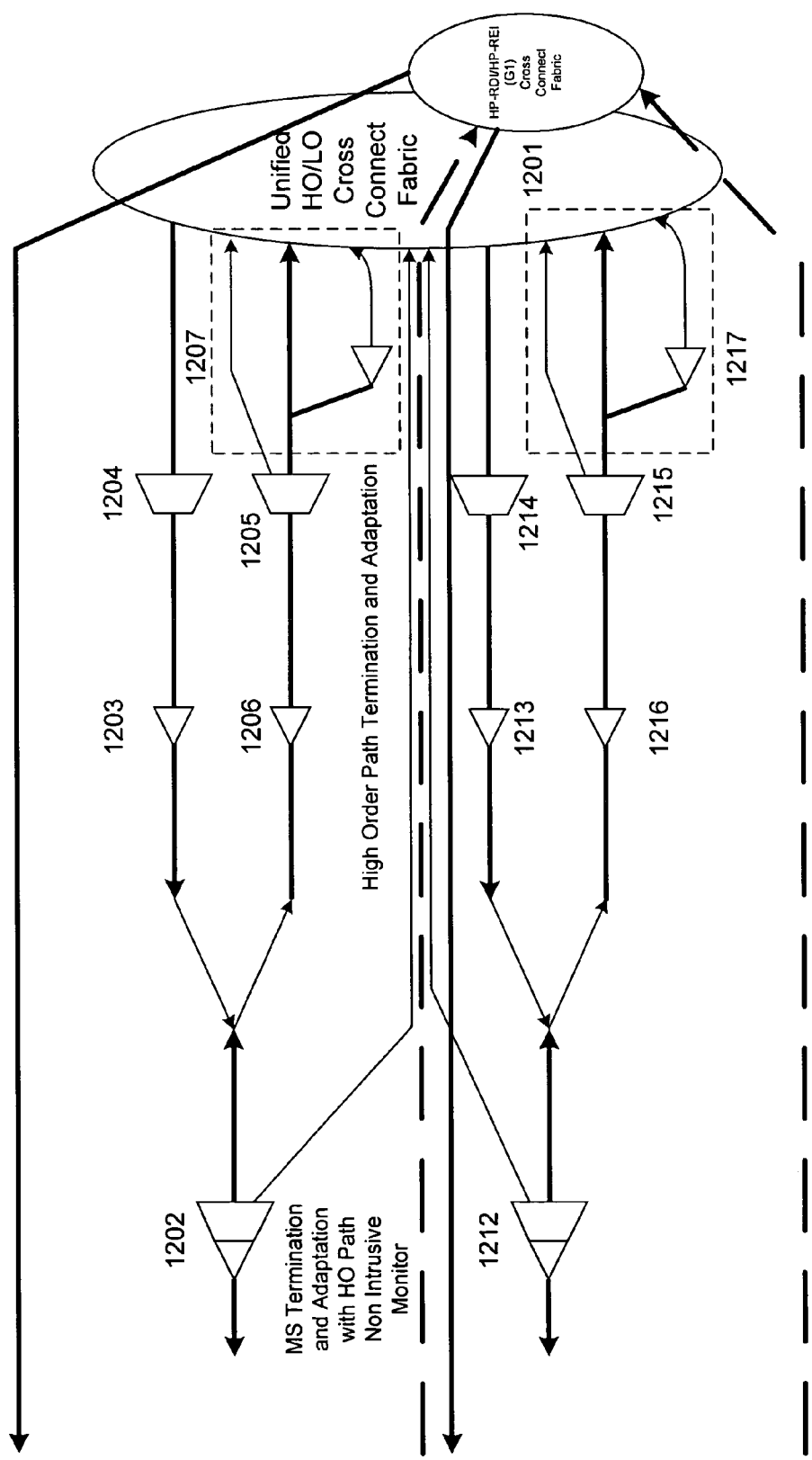
FIG. 12 is a unified HO/LO cross connect fabric interfacing with interconnected elements and devices using a single point of connection.

One aspect of an implementation of a remote status mechanism is illustrated in FIGS. 10-12. The design may include determining the receive defect status, transporting the receive defect status to multiple elements in the distributed system or, in some circumstances, to all elements of the distributed system, providing a connection matrix within each element to move the defect status to appropriate or applicable corresponding transmit channels, and generating and transmitting remote status indicators.

In operation, the receiving device detects the receive defect condition. The receiving device inserts the receive defect condition into any unused data slots in the output data stream connected to each element of the distributed system. The transmitting device may extract the condition or status, and the condition or status may be provided by cross connect to appropriate transmitting channels. The status may be employed to generate remote status indicators for the far-end or remote system. Generation of the remote status indicator may be performed at the receiving device, before transporting across devices, or at the transmitting device after submission to the cross connect.

FIG. 10 illustrates the general traffic flow and forwarding mechanism configuration within a single device. As may be appreciated, multiple devices may be interconnected to provide extended capabilities, with the ability to provide information between devices using a cross connect. The features of FIG. 10 are included within a single framer device. The top path represents the receive data stream or traffic flow, while the bottom path represents the transmit data stream or traffic flow. In a SONET/SDH configuration, the data stream may include all overhead and pointer processing data. Element 1001 is a G1 generator, where G1 represents a byte within overhead of the transmitted data in a SONET/SDH configuration. G1 generator 1001 receives the status extracted from the receive traffic flow, generates a G1 value, and inserts the G1 information into the unused overhead of the data stream. The data including the G1 information then passes to cross connect 1002, which represents an interconnection of the data stream among all elements of the distributed system. In the transmit traffic flow path, G1 information is extracted at the point shown, and the G1 information provided to the G1 cross connect 1003. Optional protection controller 1004 may be included to monitor the availability of G1 information, and if no G1 information is present, the G1 cross connect 1003 may not operate to insert G1 data into the transmit stream. Without optional protection controller 1004, the G1 cross connect 1003 will continuously extract and insert G1 data in all circumstances.

FIG. 11 illustrates G1 remote status forwarding in cascaded connection matrices. The present design uses separate high order (HO) cross connect matrix 1101 and low order (LO) cross connect matrix 1102 to process and pass data. From FIG. 11, HO cross connect matrix 1101 is connected to LO cross connect matrix 1102 by a high order path termination and adaptation connections.

From FIG. 11, data may flow from LO cross connect matrix 1102 to HO cross connect matrix 1101 through adaptation element 1104 and termination element 1103. Data may alternately flow from HO cross connect matrix 1101 to LO cross connect matrix 1102 through termination element 1106 and adaptation element 1107. Both of these paths represent the high order path termination and adaptation functionality.

The LO cross connect matrix interfaces with adaptation element 1106 using arrangement 1108, which includes path 1108a, path 1108b, termination element 1108c, and path 1108d. Path 1108b, termination element 1108c, and path 1108d provide for low order path non-intrusive monitoring, enabling monitoring of the content of the low order path and the data provided from HO cross connect matrix 1101 to LO cross connect matrix 1102. Such monitoring enables evaluating the data flowing to the LO cross connect matrix 1102, and if acceptable, forwarding the data to the LO cross connect matrix 1102. If the data is all LO and no monitoring is needed, path 1108a passes the data to the LO cross connect matrix 1102.

Termination elements 1104 and 1106 interface by termination element 1104 picking out HP-RDI/HP-REI, the high order path remote data indicator/remote error indicator, where the remote error indicator provides a count of bit errors. In SONET/SDH, G1 includes the high order protocol/layer remote defect indicator, where V5 includes the low order protocol/layer remote defect indicator.

Features 1105 and 1109 represent combination termination and adaptation elements that interface the Management System (MS) with the HO cross connect matrix 1101, and terminate the packets and adapt the packets received into HO components. The two paths represent two different incoming streams from the MS. Element 1110 is a termination component in a high order path non-intrusive monitor, while element 1111 is an alternate termination component for the high order path. Each of the two paths thus contains a high order path non-intrusive monitor, and each operates to detect a defective or bad message received. If such a defective message is located, operation switches to the other data path from the MS to the HO cross connect matrix 1101. Monitoring may be bypassed if undesired or unnecessary, or in the event pointers or the high order payload are unavailable, using paths 1112 or 1113. The lines numbered 1150 and 1151 represent incoming data from outside or remote sources (lines 1151) and data outgoing to outside or remote sources (lines 1150).

The present design may include a unified HO/LO cross connect fabric 1201 as shown in FIG. 12. Use of the design of FIG. 12 in a SONET/SDH environment can include broadcasting the G1 high order data to meet high order UPSR (unidirectional path) requirements with low order grooming in a unified matrix. The unified HO/LO cross connect fabric may include a HP-RDI/HP-REI (G1) cross connect fabric 1250, referred to here as a remote data indicator cross connect fabric 1250. The G1 value received at this remote data indicator cross connect fabric 1250 may be extracted from the incoming data stream and interpreted.

The unified cross connect fabric 1201 connects all distributed elements and specifically both the high order and low order aspects of each in a single fabric rather than two separate fabrics. Such a design allows for a single matrix to perform the interconnect functions of the cross connect fabric. Fabrication of a unified cross connect fabric comprises simply combining all performance of the HO and LO cross connect fabrics 1101 and 1102 from FIG. 11 into a single unified cross connect fabric, addressing both high order and low order functionality.

From FIG. 12, two paths are available to address unified HO/LO cross connect fabric 1201, namely an upper path and a lower path. The upper path includes combined element 1202, termination element 1203, adaptation element 1204, as well as adaptation element 1205, termination element 1206, and low order path non-intrusive monitor 1207. As with the previous design of FIG. 11, the low order path non-intrusive monitor monitors the low order path for and may remove unacceptable data. This low order path non-intrusive monitor 1207 may be bypassed. The lower path offers similar components, namely combined element 412, termination element 1213, adaptation element 1214, as well as adaptation element 1215, termination element 1216, and low order path non-intrusive monitor 1217. As contrasted with the design of FIG. 11, a single interconnection is provided with a single fabric to and from external distributed elements, and rather than processing a high order matrix and its functionality in addition to a low order matrix and its associated functionality, a single fabric is operated. The design of FIG. 12 provides for a cascaded connection matrix using interconnected elements and devices using a single point of connection. The single point of connection enables centralized control of all protection schemes at all protection levels. Centralization can be employed using a single controller, where the FIG. 11 design required a plurality of controllers. All statuses from all layers may be available using the design of FIG. 12.

Additional incoming and outgoing data paths are presented as incoming paths 1251a and 1251b and outgoing paths 1252a and 1252b. As shown, these paths interface directly with remote data indicator cross connect fabric 1250 and may pass through or employ unified HO/LO cross connect fabric 1201. These paths typically include the HP-RDI and/or HP-REI signal values.

It will be appreciated to those of skill in the art that the present design may be applied to other systems that perform data processing, and is not restricted to the communications structures and processes described herein. Further, while specific hardware elements and related structures have been discussed herein, it is to be understood that more or less of each may be employed while still within the scope of the present invention. Accordingly, any and all modifications, variations, or equivalent arrangements, which may occur to those skilled in the art, should be considered to be within the scope of the present invention as defined in the appended claims.

What is claimed is:

1. A cross connect arrangement used to connect a plurality of components in a communication network, comprising:
    a high order termination and adaptation path coupled to transmit and receive high order data and terminate and adapt components of said high order data;
    a low order termination and adaptation path coupled to transmit and receive low order data and terminate and adapt components of said low order data;
    a low order path monitor configured to monitor the low order termination and adaptation path for any absence of appropriate low order data; and
    an interconnection with the plurality of components,
    wherein said cross connect arrangement uniformly addresses high order data processing and low order data processing.

2. The arrangement of claim 1, further comprising a high order combined termination-adaptation element configured to transmit high order data to and receive high order data from the high order termination and adaptation path and interface with a data management system.

3. The arrangement of claim 1, further comprising a low order combined termination-adaptation element configured to transmit low order data to and receive low order data from the low order termination and adaptation path and interface with a data management system.

4. The arrangement of claim 2, further comprising a high order combined termination-adaptation element configured to transmit high order data to and receive low order data from the high order termination and adaptation path and interface with the data management system.

5. The arrangement of claim 1, wherein said arrangement is configured to operate on a cascaded arrangement of connection matrices.

6. The arrangement of claim 5, wherein operation on the cascaded arrangement of connection matrices comprises storing working and protection channel connection maps.

7. The arrangement of claim 5, wherein operation on the cascaded arrangement of connection matrices comprises a microengine enabled controller configured to reprogram a connection map, the microengine enabled controller driven by a cascaded connection map configuration.

8. A component in a communication network, comprising:
    a multiple order cross connection fabric employed to interconnect multiple orders of data with at least one distributed component in the communication network;
    at least one order of path termination and adaptation connection, said at least one order of path termination and adaptation connection providing an interface between the multiple order cross connection fabric and a data management system; and
    a low order combined termination-adaptation element communicatively coupled to the multiple order cross connection fabric and configured to transmit low order data to and receive low order data from a low order termination and adaptation path and interface with the data management system,
    wherein the multiple order cross connection fabric uniformly addresses high order data processing and low order data processing.

9. The component of claim 8, wherein said at least one order of path termination and adaptation connection comprises a low order path termination and adaptation connection.

10. The component of claim 9, wherein said at least one order of path termination and adaptation connection further comprises a high order path termination and adaptation connection.

11. The component of claim 9, wherein the low order path termination and adaptation connection comprises a low order path monitor configured to monitor the low order termination and adaptation path for any absence of appropriate low order data.

12. The component of claim 10, wherein the high order path termination and adaptation connection further comprises a high order combined termination-adaptation element configured to transmit high order data to and receive high order data from a high order termination and adaptation path and interface with a data management system.

13. The component of claim 8, wherein said component is configured to operate on a cascaded arrangement of connection matrices.

14. The component of claim 13, wherein operation on the cascaded arrangement of connection matrices comprises storing working and protection channel connection maps.

15. The component of claim 13, wherein operation on the cascaded arrangement of connection matrices comprises a microengine enabled controller configured to reprogram a connection map, the microengine enabled controller driven by a cascaded connection map configuration.

16. A system comprising:
at least one component;
at least one line card comprising:
- a low order path monitor configured to monitor a low order termination and adaptation path for any absence of appropriate low order data;
- a framer; and
- a controller; and a fabric configured to provide intercommunication between the line card and the at least one component;
wherein the fabric comprises a multiple order cross connection fabric employed to interconnect multiple orders of data with at least one component and at least one order of path termination and adaptation connection, said at least one order of path termination and adaptation connection providing an interface between the multiple order cross connection fabric and a data management system,
wherein the multiple order cross connection fabric uniformly addresses high order data processing and low order data processing.

17. The system of claim 16, wherein the fabric is compatible with TFI-5.

18. The system of claim 16, wherein the fabric is compatible with CSIX.

19. The system of claim 16, wherein the line card is coupled to provide an interface for a Fibre Channel compatible network.

20. The system of claim 16, wherein the line card is coupled to provide an interface for an Ethernet compatible network.

21. The system of claim 16, wherein the line card is coupled to perform add-drop multiplexing.

22. A cross connect arrangement used to connect a plurality of components in a communication network, comprising:
- a high order termination and adaptation path coupled to transmit and receive high order data and terminate and adapt components of said high order data;
- a high order combined termination-adaptation element configured to transmit high order data to and receive high order data from the high order termination and adaptation path and interface with a data management system;
- a low order termination and adaptation path coupled to transmit and receive low order data and terminate and adapt components of said low order data; and
- an interconnection with the plurality of components,
wherein said cross connect arrangement uniformly addresses high order data processing and low order data processing.

* * * * *